US008924200B2

(12) United States Patent
Gibbs et al.

(10) Patent No.: US 8,924,200 B2
(45) Date of Patent: Dec. 30, 2014

(54) AUDIO SIGNAL BANDWIDTH EXTENSION IN CELP-BASED SPEECH CODER

(75) Inventors: Jonathan A. Gibbs, Winchester (GB); James P. Ashley, Naperville, IL (US); Udar Mittal, Karnatak (IN)

(73) Assignee: Motorola Mobility LLC, Mountain View, CA (US)

( * ) Notice: Subject to any disclaimer, the term of this patent is extended or adjusted under 35 U.S.C. 154(b) by 492 days.

(21) Appl. No.: 13/247,140

(22) Filed: Sep. 28, 2011

(65) Prior Publication Data

US 2012/0095758 A1 Apr. 19, 2012

(51) Int. Cl.

*G06F 15/00* (2006.01)
*G10L 25/00* (2013.01)

(Continued)

(52) U.S. Cl.

CPC .................................... *G10L 21/038* (2013.01)
USPC ........... 704/219; 704/200; 704/201; 704/202; 704/203; 704/204; 704/205; 704/206; 704/207; 704/208; 704/209; 704/210; 704/211; 704/212; 704/213; 704/214; 704/215; 704/216; 704/217; 704/218; 704/500; 704/501; 704/502; 704/503; 704/504

(58) Field of Classification Search

CPC ... G10L 19/008; G10L 21/04; G10L 21/0208; G10L 19/12; G10L 25/90; G10L 25/93; G10L 25/78; G10L 15/20; G10L 15/22; G10L 19/005; G10L 19/0212; G10L 19/06; G10L 13/04; G10L 15/187; H05K 999/99; G11C 2207/16; H04B 1/665; H04N 7/50; H03M 7/30; G10K 11/1788
USPC ......... 704/264, 270, 262, 233, 268, 200–231, 704/500–504; 375/240; 341/50; 381/71.1
See application file for complete search history.

(56) References Cited

U.S. PATENT DOCUMENTS 5,127,054 A * 6/1992 Hong et al. .................. 704/266
5,619,004 A * 4/1997 Dame ............................ 84/616

(Continued)

FOREIGN PATENT DOCUMENTS

EP 1796084 A1 6/2007
EP 001796084 A4 * 6/2008

OTHER PUBLICATIONS

Y. Medan et al., "Super Resolution Pitch Determination of Speech Signals", IEEE Transactions on Signal Pprocessing, vol. 39, No. 1, Jan. 1991.*

(Continued)

*Primary Examiner* — Paras D Shah
*Assistant Examiner* — Anne Thomas-Homescu
(74) *Attorney, Agent, or Firm* — Birch, Stewart, Kolasch & Birch, LLP

(57) ABSTRACT

A method for decoding an audio signal in a decoder having a CELP-based decoder element including a fixed codebook component, at least one pitch period value, and a first decoder output, wherein a bandwidth of the audio signal extends beyond a bandwidth of the CELP-based decoder element. The method includes obtaining an up-sampled fixed codebook signal by up-sampling the fixed codebook component to a higher sample rate, obtaining an up-sampled excitation signal based on the up-sampled fixed codebook signal and an up-sampled pitch period value, and obtaining a composite output signal based on the up-sampled excitation signal and an output signal of the CELP-based decoder element, wherein the composite output signal includes a bandwidth portion that extends beyond a bandwidth of the CELP-based decoder element.

8 Claims, 9 Drawing Sheets

(51) Int. Cl.

| | |
|---|---|
| ***G10L 19/00*** | (2013.01) |
| ***G10L 21/00*** | (2013.01) |
| ***G10L 19/02*** | (2013.01) |
| ***G10L 25/90*** | (2013.01) |
| ***G10L 25/93*** | (2013.01) |
| ***G10L 19/06*** | (2013.01) |
| ***G10L 21/04*** | (2013.01) |
| ***G10L 21/038*** | (2013.01) |

(56) References Cited

U.S. PATENT DOCUMENTS

| | | | | |
|---|---|---|---|---|
| 5,699,477 | A * | 12/1997 | McCree | 704/216 |
| 5,839,102 | A * | 11/1998 | Haagen et al. | 704/230 |
| 6,680,972 | B1 * | 1/2004 | Liljeryd et al. | 375/240 |
| 6,775,650 | B1 * | 8/2004 | Lockwood et al. | 704/205 |
| 6,925,116 | B2 * | 8/2005 | Liljeryd et al. | 375/240 |
| 7,283,955 | B2 * | 10/2007 | Liljeryd et al. | 704/219 |
| 7,328,162 | B2 * | 2/2008 | Liljeryd et al. | 704/503 |
| 7,376,554 | B2 * | 5/2008 | Ojala et al. | 704/207 |
| 7,620,554 | B2 * | 11/2009 | Ojanpera | 704/500 |
| 7,630,882 | B2 * | 12/2009 | Mehrotra et al. | 704/205 |
| 8,204,743 | B2 * | 6/2012 | Sung et al. | 704/214 |
| 8,401,845 | B2 * | 3/2013 | Vaillancourt et al. | 704/228 |
| 2004/0230421 | A1 * | 11/2004 | Cezanne et al. | 704/207 |
| 2005/0251387 | A1 * | 11/2005 | Jelinek et al. | 704/223 |
| 2007/0174063 | A1 * | 7/2007 | Mehrotra et al. | 704/501 |
| 2007/0206645 | A1 * | 9/2007 | Sundqvist et al. | 370/516 |
| 2007/0296614 | A1 * | 12/2007 | Lee et al. | 341/50 |
| 2008/0071530 | A1 * | 3/2008 | Ehara | 704/223 |
| 2008/0126081 | A1 * | 5/2008 | Geiser et al. | 704/201 |
| 2008/0140396 | A1 * | 6/2008 | Grosse-Schulte et al. | 704/227 |
| 2009/0024399 | A1 * | 1/2009 | Gartner et al. | 704/500 |
| 2009/0070106 | A1 * | 3/2009 | Gao et al. | 704/225 |
| 2009/0083046 | A1 * | 3/2009 | Mehrotra et al. | 704/500 |
| 2009/0110208 | A1 * | 4/2009 | Choo et al. | 381/71.1 |
| 2009/0182558 | A1 * | 7/2009 | Su et al. | 704/230 |
| 2010/0010812 | A1 * | 1/2010 | Makinen | 704/221 |
| 2011/0010168 | A1 * | 1/2011 | Yu et al. | 704/219 |
| 2011/0125505 | A1 * | 5/2011 | Vaillancourt et al. | 704/500 |
| 2012/0185257 | A1 * | 7/2012 | Oh et al. | 704/500 |
| 2012/0239388 | A1 * | 9/2012 | Sverrisson et al. | 704/205 |
| 2012/0239408 | A1 * | 9/2012 | Oh et al. | 704/500 |
| 2012/0323567 | A1 * | 12/2012 | Gao | 704/201 |
| 2013/0096930 | A1 * | 4/2013 | Neuendorf et al. | 704/500 |
| 2013/0110507 | A1 * | 5/2013 | Gao | 704/219 |
| 2013/0317813 | A1 * | 11/2013 | Gao | 704/219 |
| 2013/0325487 | A1 * | 12/2013 | Oh et al. | 704/500 |

OTHER PUBLICATIONS

ITU-T Rec. G.729.1 Amendment 6 (Mar. 2010) G.729-based embedded variable bit-rate coder: An 8-32 kbit/s scalable wideband coder bitstream interoperable with G.729 Amendment 6: New Annex E on superwideband scalable extension, 78 Pages.

ITU-T Rec. G.718 Amendment 2 (Mar. 2010) Frame error robust narrow-band and wideband embedded variable bit-rate coding of speech and audio from 8-32 kbit/s Amendment 2: New Annex B on superwideband scalable extension for ITU-T G.718 and correction to main body fixed-point C-code and description text, 60 pages.

Geiser et al., "Bandwidth Extension for Hierarchical Speech and Audio Coding in ITU-T Rec. G.729.1", IEEE Transactions on Audio, Speech, and Language Processing, vol. 15, No. 8, Nov. 2007, pp. 2496-2509.

Yasheng Qian, Peter Kabal; "Combining Equalization and Estimation for Bandwidth Extension of Narrowband Speech" International Conference on Acoustics, Speech, and Signal Processing, 2004., ICASSP—2004, pp. I-713-I-716.

Gibbs et al., "Audio Signal Bandwidth Extension in CELP-Based Speech Coder" U.S. Appl. No. 13/247,129, filed Sep. 28, 2011, 27 pages.

Pillai, S.R., Robertson, W. & Phillips, W, "Subband Filters Using Allpass Structures" 1991 International Conference on Acoustics, Speech, and Signal Processing, 1991., ICASSP-91., vol. 3, pp. 1641-1644.

Mitra, S., Neuvo, Y. & Vaidyanathan, P. "Complementary IIR digital filter banks" Proceedings IEEE International Conference on Acoustics, Speech, and Signal Processing, ICASSP '85, vol. 10, pp. 529-532.

Selesnik, I., "Low-Pass Filters Realizable as All-Pass Sums: Design via a New Flat Delay Filter", IEEE Trans. Circuits & Systems—II, vol. 46, No. 1, Jan. 1999.

Patent Cooperation Treaty, International Search Report and Written Opinion of the International Searching Authority for International Application No. PCT/US2011/054862, Dec. 29, 9 pages.

* cited by examiner

AUDIO SIGNAL BANDWIDTH EXTENSION IN CELP-BASED SPEECH CODER

CROSS REFERENCE TO RELATED APPLICATIONS

The present application is related to co-pending and commonly assigned U.S. application Ser. No. 13/247,129 filed on the same date, the contents of which are incorporated herein by reference.

FIELD OF THE DISCLOSURE

The present disclosure relates generally to audio signal processing and, more particularly, to audio signal bandwidth extension in code excited linear prediction (CELP) based speech coders and corresponding methods.

BACKGROUND

Some embedded speech coders such as ITU-T G.718 and G.729.1 compliant speech coders have a core code excited linear prediction (CELP) speech codec that operates at a lower bandwidth than the input and output audio bandwidth. For example, G.718 compliant coders use a core CELP codec based on an adaptive multi-rate wideband (AMR-WB) architecture operating at a sample rate of 12.8 kHz. This results in a nominal CELP coded bandwidth of 6.4 kHz. Coding of bandwidths from 6.4 kHz to 7 kHz for wideband signals and bandwidths from 6.4 kHz to 14 kHz for super-wideband signals must therefore be addressed separately.

One method to address the coding of bands beyond the CELP core cut-off frequency is to compute a difference between the spectrum of the original signal and that of the CELP core and to code this difference signal in the spectral domain, usually employing the Modified Discrete Cosine Transform (MDCT). This method has the disadvantage that the CELP encoded signal must be decoded at the encoder and then windowed and analyzed in order to derive the difference signal, as described more fully in ITU-T Recommendation G.729.1, Amendment 6 and in ITU-T Recommendation G.718 Main Body and Amendment 2. However this often leads to long algorithmic delays since the CELP encoding delays are sequential with the MDCT analysis delays. In the example, above, the algorithmic delay is approximately 26-30 ms for the CELP part plus approximately 10-20 ms for the spectral MDCT part. FIG. 1A illustrates a prior art encoder and FIG. 1B illustrates a prior art decoder, both of which have corresponding delays associated with the MDCT core and the CELP core. Thus there is a need generally for alternative methods for coding audio signal bands that extend beyond the bandwidth of the core CELP codec in order to reduce algorithmic delay.

U.S. Pat. No. 5,127,054 assigned to Motorola Inc. describes regenerating missing bands of a subband coded speech signal by non-linearly processing known speech bands and then bandpass filtering the processed signal to derive a desired signal. The Motorola Patent processes a speech signal and thus requires the sequential filtering and processing. The Motorola Patent also employs a common coding method for all sub-bands.

The coding and reproducing of fine structure of missing bands by transposing and translating components from coded regions in the spectral domain is known generally and is sometimes referred to as Spectral Band Replication (SBR). In order for SBR processing to be employed where the speech codec operates at a bandwidth other than the input and output audio bandwidth, an analysis of the decoded speech would be required pursuant to ITU-T Recommendation G.729.1, Amendment 6 and ITU-T Recommendation G.718 Main Body and Amendment 2, resulting in relatively long algorithmic delay.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

According to one aspect of the disclosure an audio signal having an audio bandwidth extending beyond an audio bandwidth of a code excited linear prediction (CELP) excitation signal is decoded in an audio decoder including a CELP-based decoder element. Such a decoder may be used in applications where there is a wideband or super-wideband bandwidth extension of a narrowband or wideband speech signal. More generally, such a decoder may be used in any application where the bandwidth of the signal to be processed is greater than the bandwidth of the underlying decoder element.

Figure 1A:
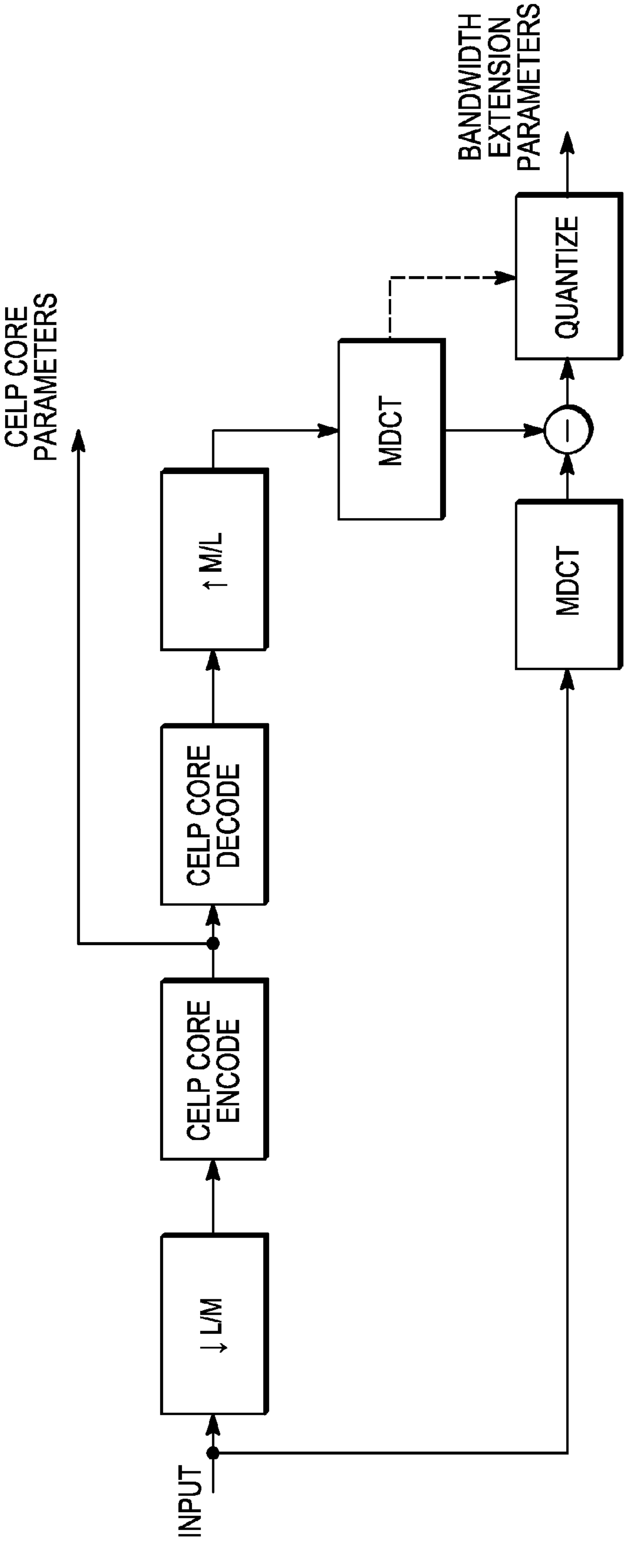
(PRIOR ART) FIG. 1A
FIG. 1A is a schematic block diagram of a prior art wideband audio signal encoder.
Figure 1B:
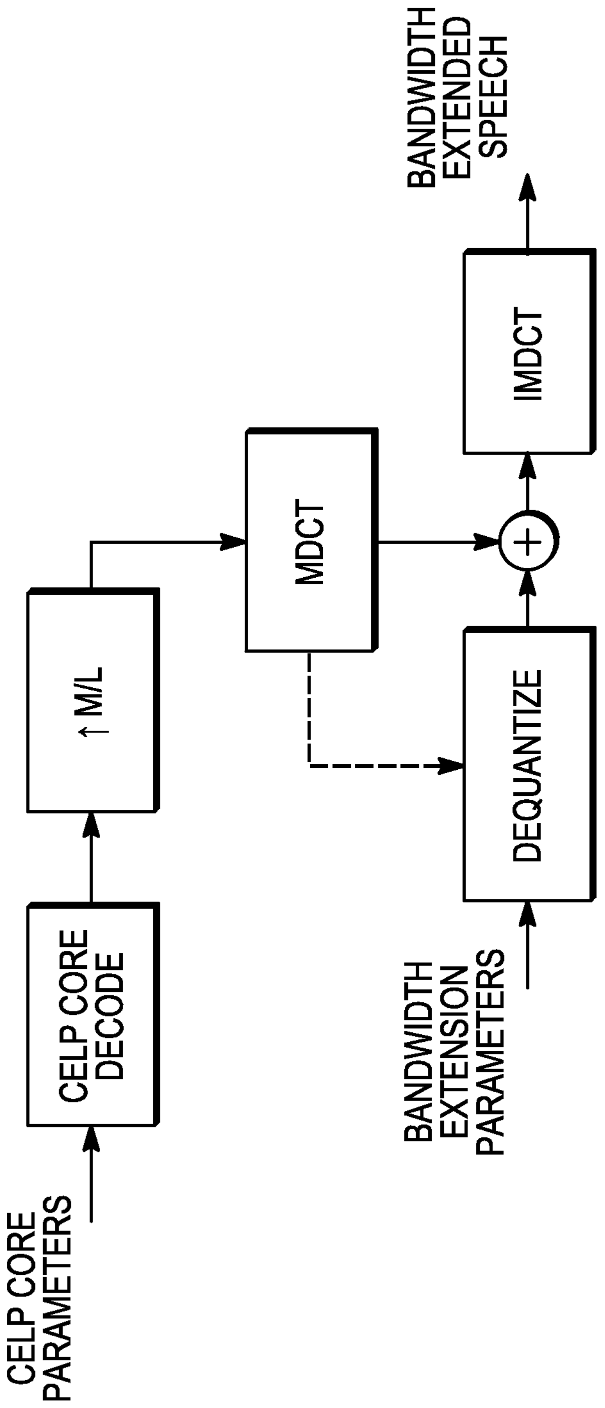
(PRIOR ART) FIG. 1B
FIG. 1B is a schematic block diagram of a prior art wideband audio signal decoder.
Figure 2:
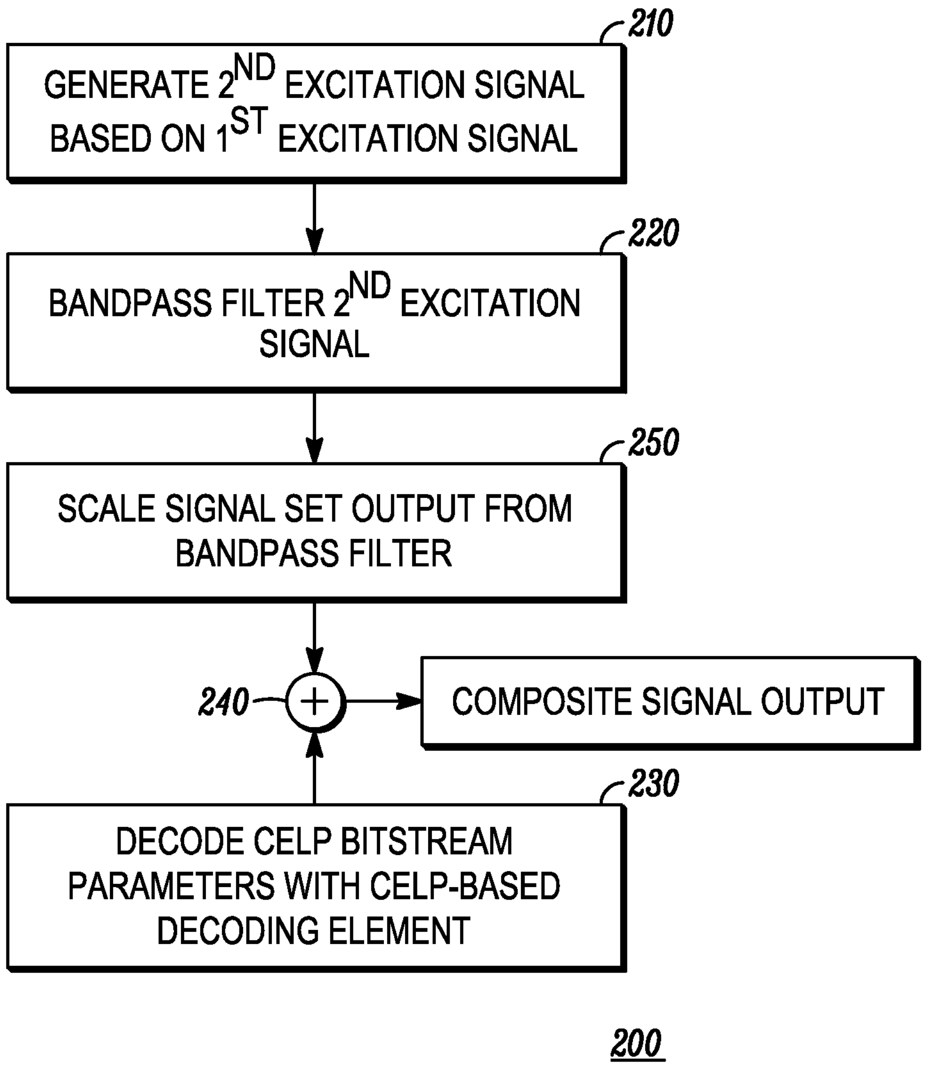
FIG. 2 is process diagram for decoding an audio signal.

The process is illustrated generally in the diagram 200 of FIG. 2. At 210, a second excitation signal having an audio bandwidth extending beyond the audio bandwidth of the CELP excitation signal is obtained or generated. Here, the CELP excitation signal is considered to be the first excitation signal, wherein the “first” and “second” modifiers are labels that differentiate among the different excitation signals.

In a more particular implementation, the second excitation signal is obtained from an up-sampled CELP excitation signal that is based on the CELP excitation signal, i.e., the first excitation signal, as described below. In the schematic block diagram 300 of FIG. 3, an up-sampled fixed codebook signal c'(n) is obtained by up-sampling a fixed codebook component, e.g., a fixed codebook vector, from a fixed codebook 302 to a higher sample rate with an up-sampling entity 304. The up-sampling factor is denoted by a sampling multiplier or factor L. The up-sampled CELP excitation signal referred to above corresponds to the up-sampled fixed codebook signal c'(n) in FIG. 3.

Figure 3:
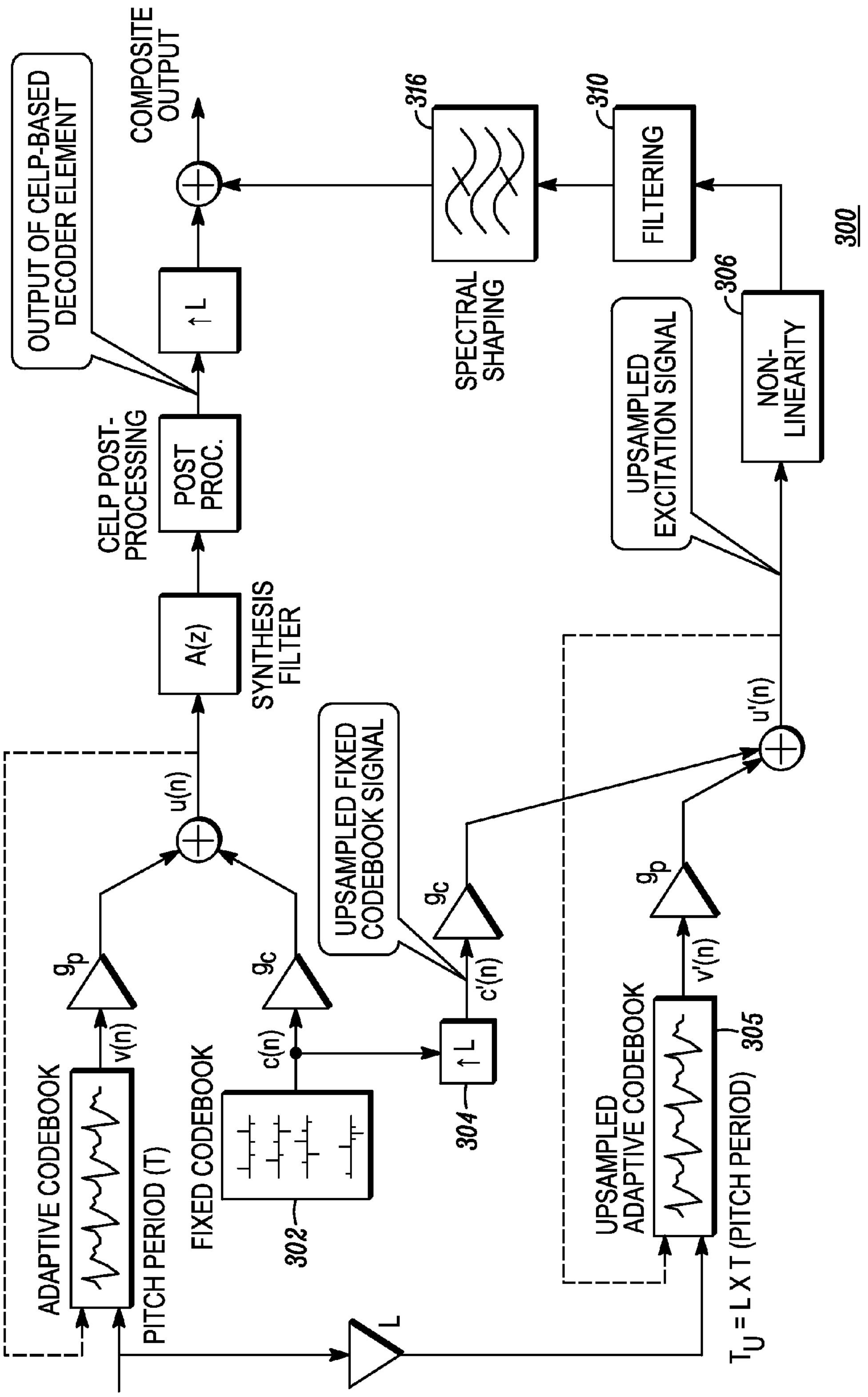
FIG. 3 is a schematic block diagram of an audio signal decoder.

Generally, an up-sampled excitation signal is based on the up-sampled fixed codebook signal and an up-sampled pitch period value. In one implementation, the up-sampled pitch period value is characteristic of an up-sampled adaptive codebook output. According to this implementation, in FIG. 3, the up-sampled excitation signal u'(n) is obtained based on the up-sampled fixed codebook signal c'(n) and an output v'(n) from a second adaptive codebook 305 operating at the up-sampled rate. In FIG. 3, the "Upsampled Adaptive Codebook" 305 corresponds to the second adaptive codebook. The adaptive codebook output signal v'(n) is obtained based on an up-sampled pitch period, $T_u$ and previous values of the up-sampled excitation signal u'(n), which constitute the memory of the adaptive codebook. Thus, both the up-sampled pitch period $T_u$ and the up-sampled excitation signal u'(n) are input to the up-sampled adaptive codebook 305. Two gain parameters, $g_c$ and $g_p$, taken directly from the CELP-based decoder element are used for scaling. The parameter $g_c$ scales the fixed codebook signal c'(n) and is also known as the fixed codebook gain. The parameter $g_p$ scales the adaptive codebook signal v'(n) and is referred to as the pitch gain.

In one embodiment, the up-sampled pitch period, $T_u$, is based on a product of the sampling multiplier L and a pitch period of the CELP-based decoder element, T, as illustrated in FIG. 3. It is common for CELP-based coders to use fractional representations of the pitch period values, typically with 1/4, 1/3 or 1/2 sample resolution. In the event that the sampling multiplier L and the resolution are numerically unrelated, for example 1/4 sample resolution and L=5, the individual pitch values for the up-sampled adaptive codebook will have non-integer values after multiplication by L. In order to ensure that the adaptive codebook of the CELP-based decoder element and the up-sampled adaptive codebook remain synchronized with one another, the up-sampled adaptive codebook may also be implemented with fractional sample resolution. This does however require additional complexity in the implementation of the adaptive codebook over the use of integer sample resolution. In order to utilize integer sample resolution in the up-sampled adaptive codebook, the alignment errors may be minimized by accumulating the approximation error from previous up-sampled pitch period values and correcting for it when setting the next up-sampled pitch period value.

In FIG. 3, the up-sampled excitation signal u'(n) is obtained by combining the up-sampled fixed codebook signal c'(n), scaled by $g_c$, with the up-sampled adaptive codebook signal v'(n), scaled by $g_p$. This up-sampled excitation signal u'(n) is also fed back into the up-sampled adaptive codebook 305 for use in future subframes as discussed above.

In an alternative implementation, the up-sampled pitch period value is characteristic of an up-sampled long-term predictor filter. According to this alternative implementation, the up-sampled excitation signal u'(n) is obtained by passing the up-sampled fixed codebook signal c'(n) through an up-sampled long-term predictor filter. The up-sampled fixed codebook signal c'(n) may be scaled before it is applied to the up-sampled long-term predictor filter or the scaling may be applied to the output of the up-sampled long-term predictor filter. The up-sampled long term predictor filter, $L_u(z)$, is characterized by the up-sampled pitch period, $T_u$, and a gain parameter G, which may differ from $g_p$, and has a z-domain transfer function similar in form to the following equation.

$$L_u(z) = \frac{1}{1 - G_z^{-T_u}} \qquad \text{Eqn. (1)}$$

Generally, the audio bandwidth of the second excitation signal is extended beyond the audio bandwidth of the CELP-based decoder element by applying a non-linear operation to the second excitation signal or to a precursor of the second excitation signal. In FIG. 3, the audio bandwidth of the up-sampled excitation signal u'(n) is extended beyond the audio bandwidth of the CELP-based decoder element by applying a non-linear operator 306 to the up-sampled excitation signal u'(n). Alternatively, an audio bandwidth of the up-sampled fixed codebook signal c'(n) is extended beyond the audio bandwidth of the CELP-based decoder element by applying the non-linear operator to the up-sampled fixed codebook signal c'(n) before generation of the up-sampled excitation signal u'(n). The up-sampled excitation signal u'(n) in FIG. 3 that is subject to the non-linear operation corresponds to the second excitation signal obtained at block 210 in FIG. 2 as described above.

In some embodiments specifically designed to address unvoiced speech, the second excitation signal may be scaled and combined with a scaled broadband Gaussian signal prior to filtering. A mixing parameter related to an estimate of the voicing level, V, of the decoded speech signal is used in order to control the mixing process. The value of V is estimated from the ratio of the signal energy in the low frequency region (CELP output signal) to that in the higher frequency region as described by the energy based parameters. Highly voiced signals are characterized as having high energy at lower frequencies and low energy at higher frequencies, yielding V values approaching unity. Whereas highly unvoiced signals are characterized as having high energy at higher frequencies and low energy at lower frequencies, yielding V values approaching zero. It will be appreciated that this procedure will result in smoother sounding unvoiced speech signals and achieve a result similar to that described in U.S. Pat. No. 6,301,556 assigned to Ericsson Telefon AB.

The second excitation signal is subject to a bandpass filtering process, whether or not the second excitation signal is scaled and combined with a scaled broadband Gaussian signal as described above. Particularly, a set of signals is obtained or generated by filtering the second excitation signal with a set of bandpass filters. Generally, the bandpass filtering process performed in the audio decoder corresponds to an equivalent filtering process applied to an input audio signal at an encoder. In FIG. 3, at 310, the set of signals are generated by filtering the up-sampled excitation signal u'(n) with a set of bandpass filters. The filtering performed by the set of bandpass filters in the audio decoder corresponds to an equivalent process applied to a sub-band of the input audio signal at the encoder used to derive the set of energy based parameters or scaling parameters as described further below with reference to FIG. 5. The corresponding equivalent filtering process in the encoder would normally be expected to comprise similar filters and structures. However, while the filtering process at the decoder is performed in the time domain for signal reconstruction, the encoder filtering is primarily needed for obtaining the band energies. Therefore, in an alternate embodiment, these energies may be obtained using an equivalent frequency domain filtering approach wherein the filtering is implemented as a multiplication in the Fourier Transform domain and the band energies are first computed in the frequency domain and then converted to energies in the time domain using, for example, Parseval's relation.

Figure 4:
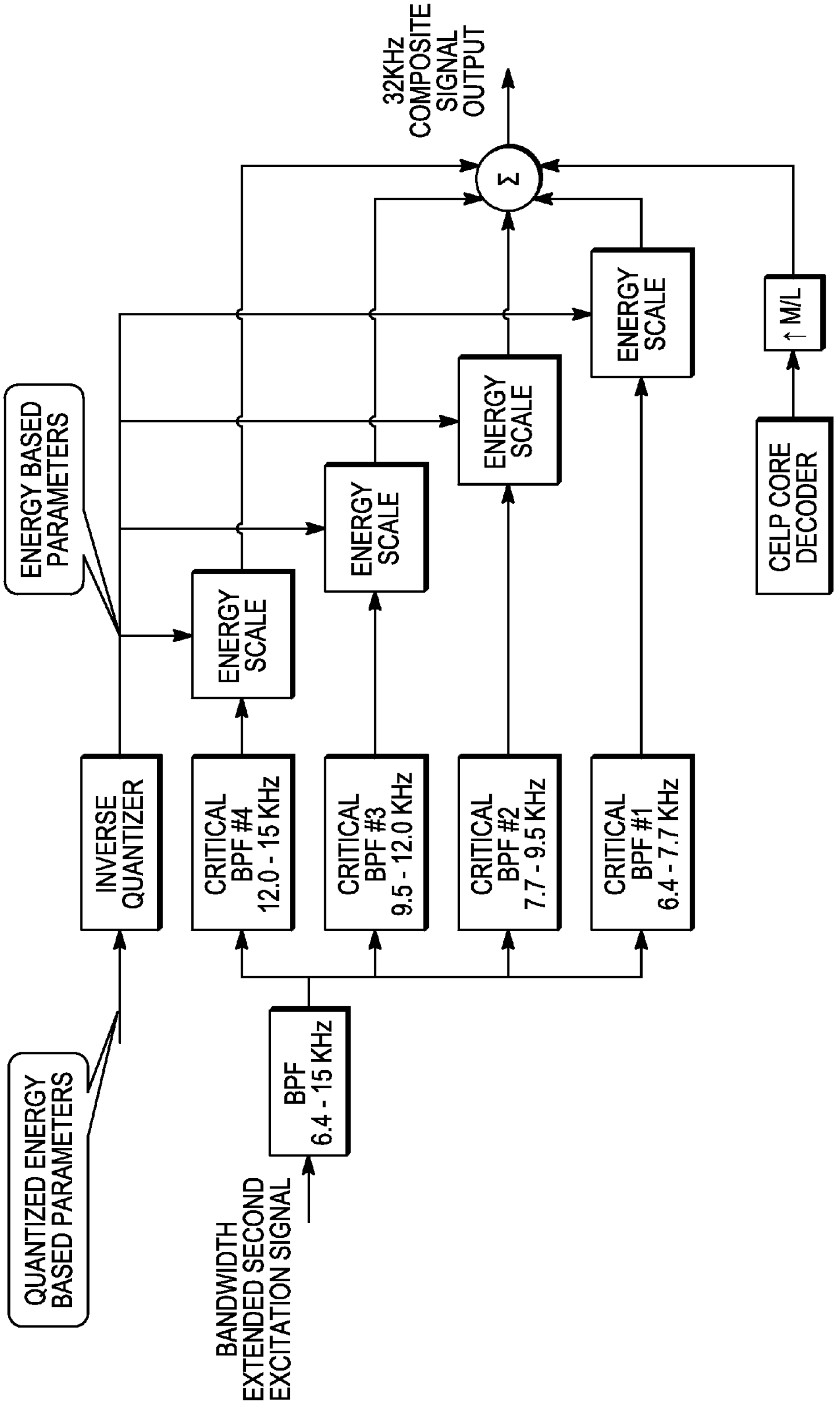
FIG. 4 is a schematic block diagram of a bandpass filter-bank in the decoder.

FIG. 4 illustrates the filtering and spectral shaping performed at the decoder for super-wideband signals. Low frequency components are generated by the core CELP codec via an interpolation stage by a rational ratio M/L (5/2 in this case) whilst higher frequency components are generated by filtering the bandwidth extended second excitation signal with a bandpass filter arrangement with a first bandpass pre-filter tuned to the remaining frequencies above 6.4 kHz and below 15 kHz. The frequency range 6.4 kHz to 15 kHz is then further subdivided with four bandpass filters of bandwidths approximating the bands most associated with human hearing, often referred to as "critical bands". The energy from each of these filters is matched to those measured in the encoder using energy based parameters that are quantized and transmitted by the encoder.

Figure 5:
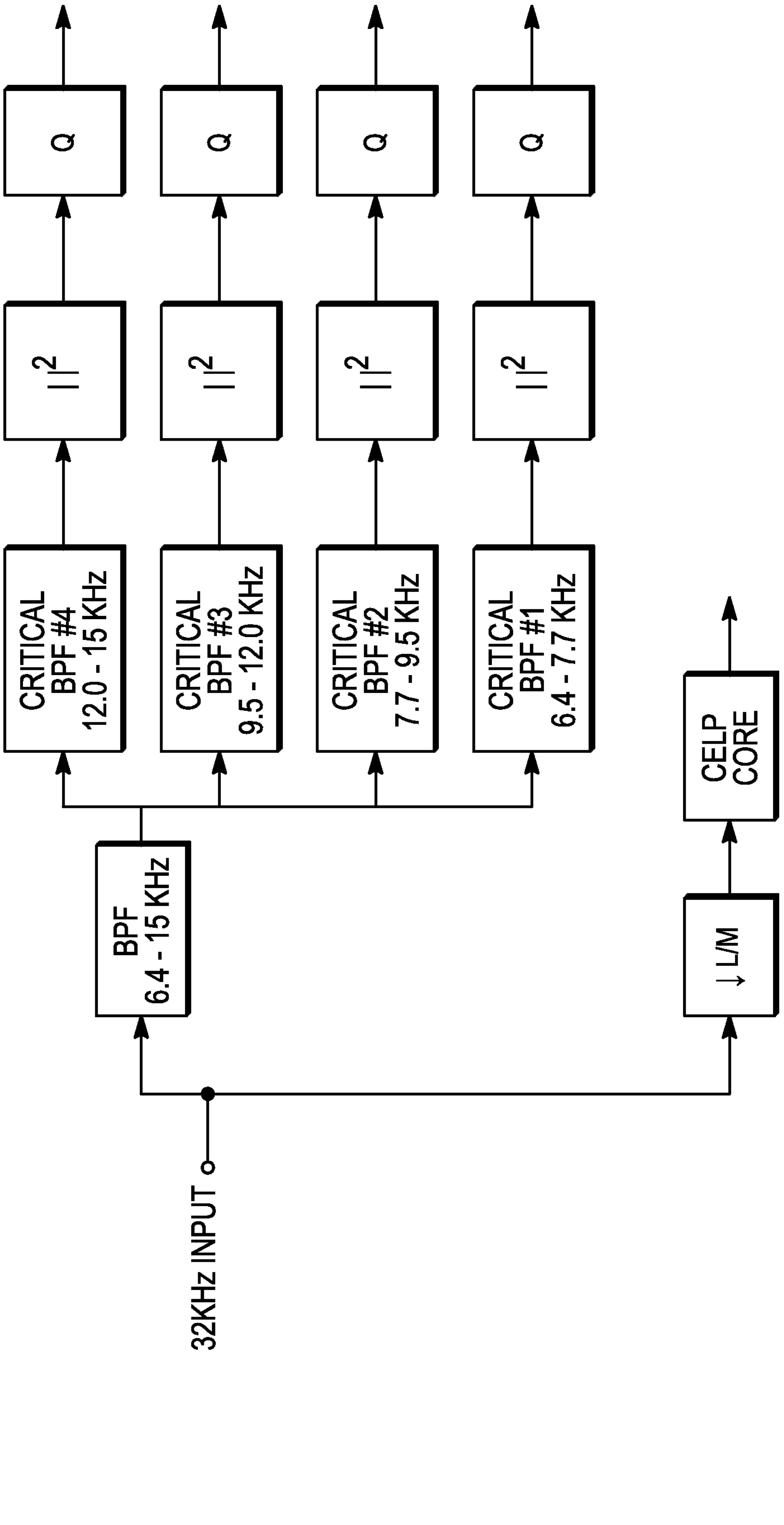
FIG. 5 is a schematic block diagram of a bandpass filter-bank in the encoder.

FIG. 5 illustrates the filtering performed at the encoder for super-wideband signals. The input signal at 32 kHz is separated into two signal paths. Low frequency components are directed toward the core CELP codec via a decimation stage by a rational ratio L/M (2/5 in this case) whilst higher frequency components are filtered out with a bandpass filter tuned to the remaining frequencies above 6.4 kHz and below 15 kHz. The frequency range 6.4 kHz to 15 kHz is then further subdivided with four bandpass filters (BPF #1-#4) of bandwidths approximating the bands most associated with human hearing. The energy from each of these filters is measured and parameters related to the energy are quantized for transmission to the decoder. Using the same filtering in the encoder and the decoder will ensure that the two processes are equivalent. However equivalence may also be maintaining if the encoder and decoder filtering processes use similar equivalent bandwidths and pass-band corner frequencies. Gain differences between different filter structures may be compensated for during design and characterization and incorporated into the signal scaling procedure.

Figure 6:
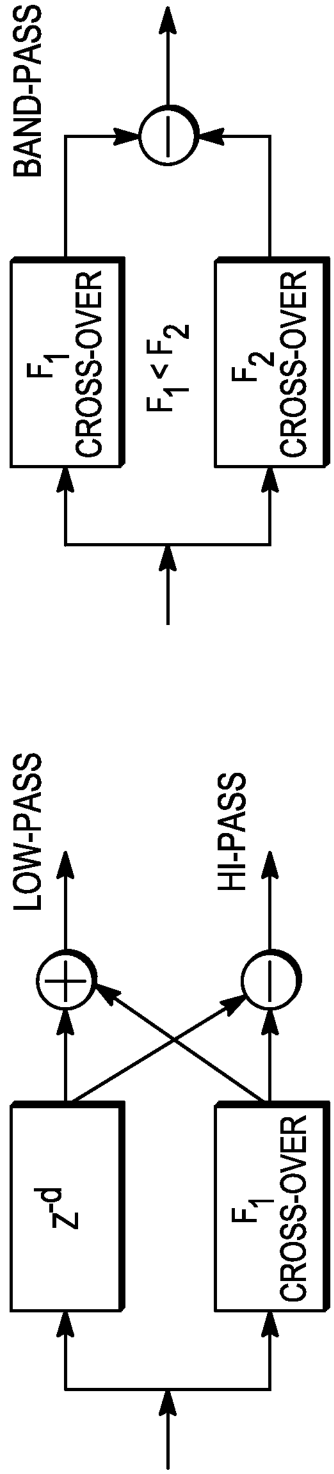
FIG. 6 is a schematic block diagram of a complementary filter-bank.

In one implementation, the bandpass filtering process in the decoder includes combining the outputs of a set of complementary all-pass filters. Each of the complementary all-pass filters provides the same fixed unity gain over the full frequency range, combined with a non-uniform phase response. The phase response may be characterized for each all-pass filter as having a constant time delay (linear phase) below a cut-off frequency and a constant time delay plus a Π phase shift above the cut-off frequency. When one all-pass filter is added to an all-pass filter comprising a constant time delay ($z^{-d}$) the output has a low-pass characteristic with frequencies below the cut-off frequency in-phase, and so reinforcing one-another, whereas above the cut-off frequency the components are out-of-phase, and so cancel each other out. Subtracting the outputs from the two filters yields a high-pass response as the reinforced regions and cancellation regions are exchanged. When the outputs of two all-pass filters are subtracted from one another, the in-phase components of the two filters cancel one another whereas the out-of-phase components reinforce to yield a band-pass response. This is depicted in FIG. 6 with a preferred embodiment of the filtering process for super-wideband signals using the all-pass principles shown in FIG. 6.

Figure 7:
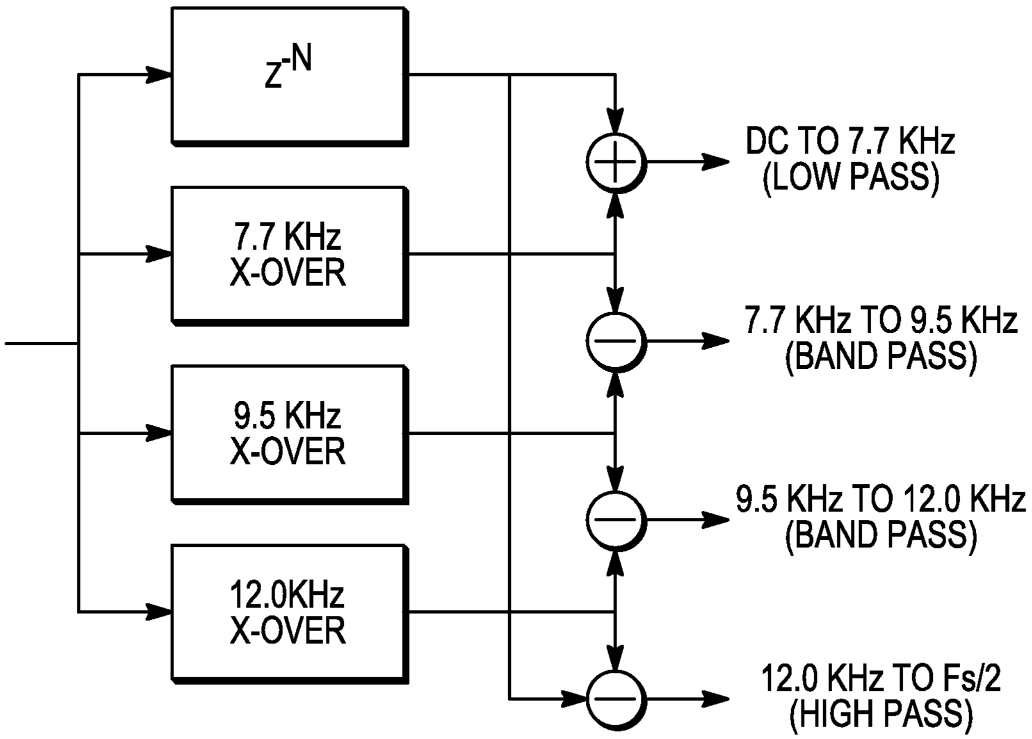
FIG. 7 is a schematic block diagram of an alternative complementary filter-bank.

FIG. 7 illustrates a specific implementation of the band splitting of the frequency range from 6.4 kHz to 15 kHz into four bands with complementary all-pass filters. Three all-pass filters are employed with cross-over frequencies of 7.7 kHz, 9.5 kHz and 12.0 kHz to provide the four bandpass responses when combined with a first bandpass pre-filter described above which is tuned to the 6.4 kHz to 15 kHz band.

In another implementation, the filtering process performed in the decoder is performed in a single bandpass filtering stage without a bandpass pre-filter.

In some implementations, the set of signals output from the bandpass filtering are first scaled using a set of energy-based parameters before combining. The energy-based parameters are obtained from the encoder as discussed above. The scaling process is illustrated at 250 in FIG. 2. In FIG. 3, the set of signals generated by filtering are subject to a spectral shaping and scaling operation at 316.

Figure 8A:
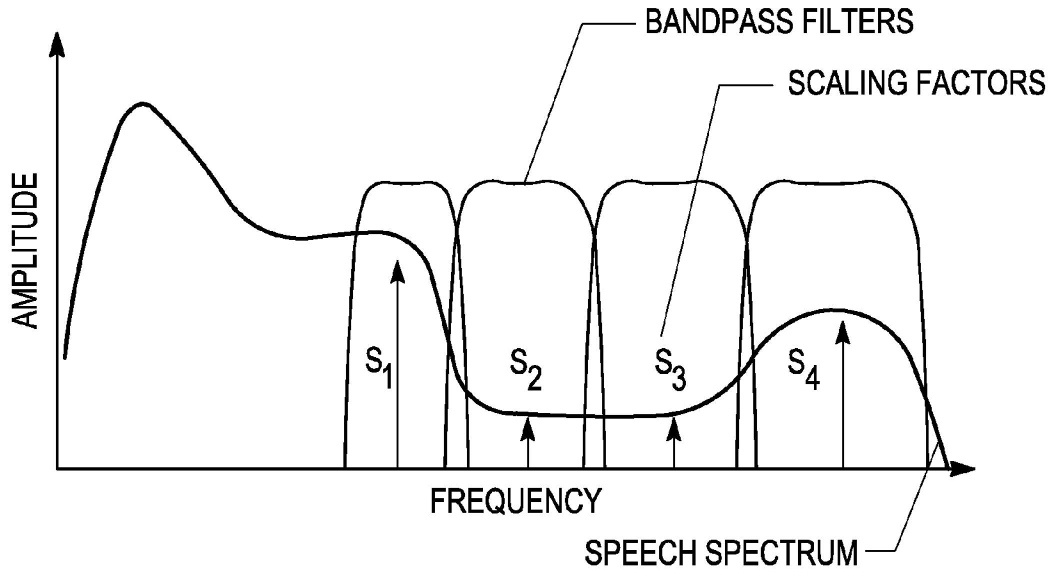
FIG. 8A is a schematic block diagram of a first spectral shaping process.
Figure 8B:
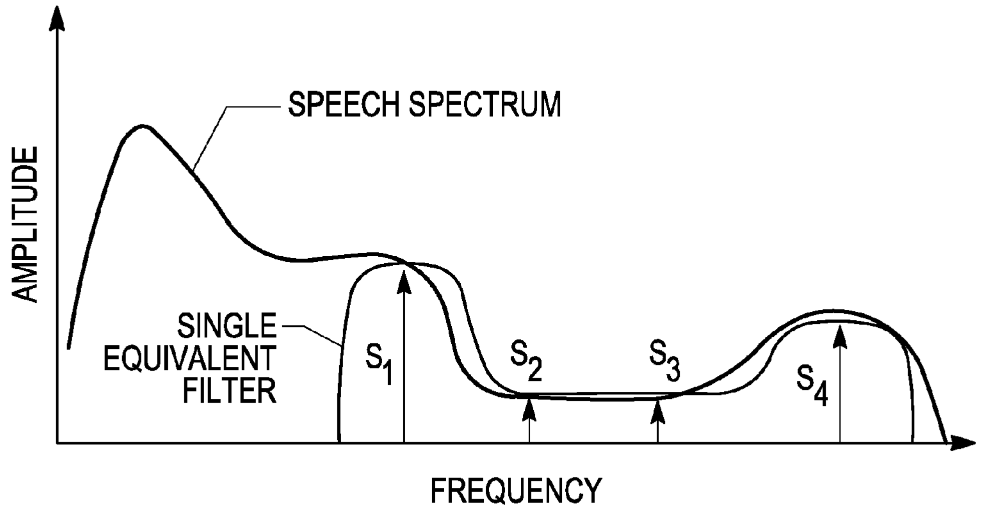
FIG. 8B is a schematic block diagram of a second spectral shaping process equivalent to the process in FIG. 8A.

FIG. 8A illustrates the scaling operation for super-wideband signals from 6.4 kHz to 15 kHz with four bands. For each of the four discrete bandpass filters, a scale factor ($S_1$, $S_2$, $S_3$ and $S_4$) is used as a multiplier at the output of the corresponding bandpass filter to shape the spectrum of the extended bandwidth. FIG. 8B depicts an equivalent scaling operation to that shown in FIG. 8A. In FIG. 8B, a single filter having a complex amplitude response provides similar spectral characteristics to the discrete bandpass filter model shown in FIG. 8A.

In one embodiment, the set of energy-based parameters are generally representative of an input audio signal at the encoder. In another embodiment, the set of energy-based parameters used at the decoder are representative of a process of bandpass filtering an input audio signal at the encoder, wherein the bandpass filtering process performed at the encoder is equivalent to the bandpass filtering of the second excitation signal at the decoder. It will be evident that by employing equivalent or even identical filters in the encoder and decoder and matching the energies at the output of the decoder filters to those at the encoder, the encoder signal will be reproduced as faithfully as possible.

In one implementation, the set of signals is scaled based on energy at an output of the set of bandpass filters in the audio decoder. The energy at the output of the set of bandpass filters in the audio decoder is determined by an energy measurement interval that is based on the pitch period of the CELP-based decoder element. The energy measurement interval, $I_e$, is related to the pitch period, T, of the CELP-based decoder element and is dependent upon the level of voicing estimated, V, in the decoder by the following equation.

$$I_e = \begin{cases} LT; & V \geq 0.7 \\ S; & V < 0.7 \end{cases} \qquad \text{Eqn. (2)}$$

where S is a fixed number of samples that correspond to a speech synthesis interval and L is the up-sampling multiplier. The speech synthesis interval is usually the same as the subframe length of the CELP-based decoder element.

In FIG. 2, at 230, the audio signal is decoded by the CELP-based decoder element while the second excitation signal and the set of signals are obtained. At 240, a composite output signal is obtained or generated by combining the set of signals with a signal based on an audio signal decoded by the CELP-based decoder element. The composite output signal includes a bandwidth portion that extends beyond a bandwidth of the CELP excitation signal.

In FIG. 3, generally, the composite output signal is obtained based on the up-sampled excitation signal u' (n) after filtering and scaling and the output signal of the CELP-based decoder element wherein the composite output signal includes an audio bandwidth portion that extends beyond an audio bandwidth of the CELP-based decoder element. The composite output signal is obtained by combining the bandwidth extended signal to the CELP-based decoder element with the output signal of the CELP-based decoder element. In one embodiment, the combining of the signals may be achieved using a simple sample-by-sample addition of the various signals at a common sampling rate.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method for decoding a signal in an audio decoder having a CELP-based decoder element that includes a fixed codebook component, at least one pitch period value, and a first decoder output, an audio bandwidth of the signal extends beyond an audio bandwidth of the CELP-based decoder element, the method comprising:

obtaining an up-sampled fixed codebook signal by up-sampling the fixed codebook component to a higher sample rate;

obtaining an up-sampled excitation signal based on the up-sampled fixed codebook signal and an integer up-sampled pitch period value;

obtaining a composite output signal based on the up-sampled excitation signal and an output signal of the CELP-based decoder element; and deriving the integer up-sampled pitch period value by multiplying the fractional pitch period of the CELP-based decoder element by an up-sampling factor, adding accumulated error from previous integer roundings, and rounding the result, wherein the composite output signal includes an audio bandwidth portion that extends beyond an audio bandwidth of the CELP-based decoder element.

2. The method of claim 1 further comprising:

obtaining a bandwidth extended signal by applying a non-linear operation to the up-sampled excitation signal, obtaining the composite output signal by combining the bandwidth extended signal to the CELP-based decoder element with the output signal of the CELP-based decoder element.

3. The method of claim 1, obtaining the up-sampled excitation signal based on the up-sampled fixed codebook signal and an up-sampled adaptive codebook value, wherein the up-sampled adaptive codebook value is based on the integer up-sampled pitch period value.

4. The method of claim 1, obtaining the up-sampled excitation signal by filtering the up-sampled fixed codebook signal using an up-sampled long-term predictor filter, wherein the up-sampled long-term predictor filter is characterized by the integer up-sampled pitch period value.

5. The method of claim 1, obtaining the up-sampled excitation signal by combining the up-sampled fixed codebook signal with the up-sampled adaptive codebook and feeding the result back into the up-sampled adaptive codebook.

6. The method of claim 1, obtaining the up-sampled excitation signal by passing the up-sampled fixed codebook signal through an up-sampled long-term predictor filter.

7. The method of claim 1 further comprising extending an audio bandwidth of the up-sampled fixed codebook signal beyond the audio bandwidth of the CELP-based decoder element by applying a non-linear operator to the up-sampled fixed codebook.

8. The method of claim 1 extending the audio bandwidth of the up-sampled excitation signal beyond the audio bandwidth of the CELP-based decoder element by applying a non-linear operator to the up-sampled excitation signal.

* * * * *